US005681601A

United States Patent [19]

Hendrick et al.

[11] Patent Number: 5,681,601
[45] Date of Patent: *Oct. 28, 1997

[54] LOW CALORIE FAT SUBSTITUTE

[75] Inventors: Michael E. Hendrick, Groton; Robert A. Reimer, Mystic, both of Conn.

[73] Assignee: Cultor Ltd., Helsinki, Finland

[*] Notice: The term of this patent shall not extend beyond the expiration date of Pat. No. 5,356,644.

[21] Appl. No.: 637,463

[22] Filed: Apr. 25, 1996

Related U.S. Application Data

[63] Continuation of Ser. No. 324,324, Oct. 17, 1994, abandoned, which is a continuation of Ser. No. 957,648, Oct. 24, 1992, Pat. No. 5,356,644, which is a continuation of Ser. No. 607,216, Oct. 29, 1990, abandoned, which is a continuation of Ser. No. 301,578, Jan. 25, 1989, abandoned.

[51] Int. Cl.[6] ............................................. A23L 1/307
[52] U.S. Cl. ............................................. 426/99; 426/804
[58] Field of Search ............................ 426/98, 99, 580, 426/804

[56] References Cited

U.S. PATENT DOCUMENTS

| | | | |
|---|---|---|---|
| 3,389,000 | 6/1968 | Fujita | 426/98 |
| 3,948,094 | 4/1976 | Johnson | 426/99 |
| 4,073,960 | 2/1978 | Scott | 426/580 |
| 4,305,964 | 12/1981 | Moran | 426/99 |
| 4,704,288 | 11/1987 | Tsau | 426/99 |
| 5,356,644 | 10/1994 | Hendrick | 426/99 |

OTHER PUBLICATIONS

Whistler et al, Industrial Gums 1973 pp. 58, 59, 71, 93, 103–105.

Primary Examiner—Carolyn Paden
Attorney, Agent, or Firm—Ronald S. Courtney

[57] ABSTRACT

There is disclosed a low calorie fat substitute comprising an outer coating of a digestible fat surrounding an inner core of a low caloric or non-caloric material.

18 Claims, No Drawings

LOW CALORIE FAT SUBSTITUTE

This application is a continuation of Ser. No. 08/324,324, filed on Oct. 17, 1994, now abandoned, which is a continuation of Ser. No. 07/957,648, filed Oct. 24, 1992, now U.S. Pat. No. 5,356,644, which is a continuation of Ser. No. 07/607,216, filed Oct. 29, 1990, now abandoned, which is a continuation of Ser. No. 07/301,578, filed Jan. 25, 1989, now abandoned.

BACKGROUND OF THE INVENTION

The present invention relates to low calorie fat substitutes. More particularly, it relates to a free-flowing low calorie fat substitute wherein an inner low caloric or non-caloric core material is surrounded by a digestible fat composition.

In today's health conscious society, there is a growing demand for low-calorie foods. Excess body weight not only creates a feeling of low self-confidence in social situations but also has been shown to contribute to the impairment of the cardiovascular function of the individual. Moreover, the reduction of the physical performance capacity of the individual is another consequence of excess body weight.

Many approaches have been suggested to control excess body weight. The use of chemical appetite suppressants and appetite inhibitors is a well known approach but these chemical agents are often unsafe for long-term use and/or have undesirable side effects and are usually available only through a physician's prescription.

Low calorie foods have also been widely advocated as a diet regimen to control excess body weight. Such low-calorie foods include low calorie spreads, which are typically water-in-oil (w/o) emulsions; and low-calorie sauces, such as salad dressings and mayonnaise, which are typically oil-in-water emulsions.

Recently water-in-oil-in-water emulsions (w/o/w) have been proposed as an additive for low calorie foods. Such w/o/w emulsions are described in U.S. Pat. Nos. 4,650,690, 4,632,840 and 4,590,086.

Low-calorie food additives comprising hollow microspheres of saccharose polyester are described in German Offenlegungsschrift No. DE 30 03 401.

Low calorie food additives comprising hollow microspheres of vinylidene chloride-acrylonitrile copolymers are described in German Offenlegungsschrift No. DE 25 30 118.

U.S. Pat. No. 4,198,400 refers to a water-reconstitutable juice or soup composition which contains cellulose dietary fibers coated with lipids to render the cellulose fiber hydrophobic.

U.S. Pat. No. 4,305,964 refers to an artificial cream-type food product having a continuous liquid aqueous phase comprising a dispersed oil phase and gelled water beads.

U.S. Pat. Nos. 4,734,287 and 4,744,521 refer to proteinaceous, water-dispersible macrocolloids comprising substantially non-aggregated particles of dairy whey protein.

SUMMARY OF THE INVENTION

In one embodiment, the present invention is directed to a microparticulate, free-flowing composition comprising a coating of a digestible solid or semi-solid fat composition surrounding a low-caloric or non-caloric core material, said composition useful as a low-calorie fat substitute which is substantially insoluble under conditions of food formulation, provided that if the core material is cellulose, the cellulose is non-fibrous.

In a preferred embodiment, the fat composition is useful as a low calorie fat substitute for foods sen, ed at or near ambient temperatures.

In a preferred embodiment, the core material is selected from the group consisting of solids, liquids, gases, foams, gel-forming compositions, and combinations thereof.

More preferably the core material is selected from the group consisting of ultrafine microcrystalline cellulose, polydextrose, non-fibrous cellulose derivatives, micronized bran and waxes.

Especially preferred is the composition wherein the core material is polydextrose.

Also preferred is the composition wherein the core material is an aqueous gel-forming composition with preferred aqueous gel-forming compositions selected from the group consisting of agar, alginates, carrageenans, xanthans, locust bean gum, gelatin, guar gum, gellam gum, cellulose derivatives, pectin, starch polydextrose/pectin combinations, succinoglycans and scleroglucans, in an aqueous medium.

Preferred also is the composition wherein the core material is an aqueous gel forming composition formed by combining, in an aqueous medium, a gel-forming amount of the appropriate polysaccharide with a salt of a polyvalent metal cation capable of cross-linking said polysaccharide. Preferred polyvalent metal cations are food grade metal cations. Preferred aqueous gel forming compositions are those wherein the gel-forming polysaccharide is selected from the group consisting of alginates, succinoglycans, xanthans, gelatins, pectins and scleroglucans, and the polyvalent metal cation is calcium (II) or magnesium (II). Another preferred aqueous gel-forming composition is that wherein the gel-forming polysaccharide is carrageenan and the polyvalent metal cation is calcium (II), ammonium (I) or potassium (I).

In another preferred embodiment, the composition comprises roughly spheroidal particles having a mean diameter of less than 250 microns, with an especially preferred mean diameter of from about 2 to about 50 microns.

Also preferred is the composition wherein the fat composition has a melting point of from about 20° to about 45° C.

Preferred digestible fat coatings are animal fats, partially or totally hydrogenated vegetable oils, mono-, di- and triglycerides, and phospholipids.

Preferred is the composition wherein the core material comprises from about 50% to about 95%, by volume, of the composition.

Also included in the present invention is the inclusion of a layer of material between said core material and said shell, said layer different from said core material. Preferred layer materials are selected from the group consisting of cellulose, methylcellulose, cellulose acetate phthalate, albumin, casein, zein, agar, gelatin, pectin and gum arabic.

Also forming a part of the present invention is a process for forming the low caloric fat substitute composition comprising coating a low-caloric or non-caloric core material with a solid fat composition.

Preferred processes for coating the core material are pan coating, spin disc coating, gas suspension coating, centrifugal coextrusion, rotational suspension, coacervation, inclusion complexation, spray coating and spray drying.

Foods containing the fat substitute composition of the present invention also form a part of the present invention. Non-limiting examples of such foods are frozen deserts, salad dressings, mayonnaise, food spreads, spray coatings for crackers and snack chips, fillings for cakes or cookies, cake frostings, confections, gravies and peanut spreads.

DETAILED DESCRIPTION OF THE INVENTION

The present invention is directed to a microparticulate, free-flowing composition comprising a coating of a solid or semi-solid digestible fat composition surrounding an inner core of a low-caloric or non-caloric material, whereby the composition is useful as a low calorie fat substitute which is substantially insoluble under conditions of food formulation, provided that if the core material is cellulose, the cellulose is non-fibrous.

By the term "free-flowing composition" is meant a composition comprising a pourable, particulate solid material. Preferably, the composition is a dried solid composition.

By the term "microparticulate" is meant a composition consisting of particles having a mean diameter of less than 250 microns.

By the term "non-caloric or low caloric core material" is meant a core material which has a caloric value varying from about 0 to about 3.0 cal/gm.

By the term "substantially insoluble" under conditions of food formulation is meant that the composition retains its structural integrity so that the fat coated core material does not dissolve to release the fat when it is incorporated into a food formulation.

The core material may consist of a solid, semi-solid, gaseous, liquid, gel-forming or foam composition, or combinations thereof. Preferred core materials are ultrafine microcrystalline cellulose, polydextrose, erythritol, non-fibrous cellulose derivatives, micronized bran and waxes. All the above materials are commercially available items of commerce.

The core material may also be an aqueous gel-forming composition. Aqueous gel-forming compositions are formed by dissolving a gel-forming composition in an aqueous medium. Examples of gel-forming compositions are xanthans, succinoglycans, agar, alginates, carrageenans, locust bean gum, starch, gelatin, guar gum, hydroxypropylcellulose, hydroxymethylcellulose, pectin, scleroglucans, and polydextrose/pectin combinations. The amount of the gel-forming composition to be dissolved in the aqueous medium to form the aqueous gel-forming composition is readily determined by a person of ordinary skill in the art.

Preferred also is the composition wherein the core material is an aqueous gel forming composition formed by combining, in an aqueous medium, a gel-forming amount of the appropriate polysaccharide with a salt of a polyvalent metal cation capable of cross-linking said biopolymer. Preferred polyvalent metal cations are food grade metal cations. Preferred aqueous gel forming compositions are those wherein the gel-forming polysaccharide is selected from the group consisting of alginates, succinoglycans, xanthans, gelatins, pectins and scleroglucans, and the polyvalent metal cation is calcium (II) or magnesium (II). Another preferred aqueous gel-forming composition is that wherein the gel-forming polysaccharide is carrageenan and the polyvalent metal cation is calcium (II), ammonium (I) or potassium (I).

In certain instances, it has been found useful to include an additional layer of material between the core material and the outer shell. Most advantageously, the additional layer is of a material different from the core material. Preferred materials for this layer material include cellulose, methylcellulose, cellulose acetate phthalate, albumin, casein, zein, agar, gelatin, pectin and gum arabic.

Preferably, the composition of the present invention is in the form of roughly spheroidal particles having a mean diameter of less than about 250 microns. To form the roughly spheroidal particles, the core material chosen should be roughly spherical. In this respect, if the core material chosen is cellulose, it has been found advantageous to use a non-fibrous cellulose material, especially ultrafine microcrystalline cellulose.

The term "fat" is used herein to mean glyceryl triesters of fatty acids and other fatlike compounds such as glyceryl mono and diesters of fatty acids, partially or totally hydrogenated vegetable oils and phospholipids.

Included within the present invention are those compositions wherein the core material is a gaseous material. By the term "gaseous" is meant air, nitrogen carbon dioxide, or mixtures thereof. In those instances wherein the core material is gaseous, the composition is in the form of microspheres. These microspheres consist of a gaseous core coated with the digestible fat. An exemplary process for preparing these fat coated microspheres consists of first creating an oil in water emulsion using a volatile solvent, e.g. ethyl acetate, an emulsifying agent, and the appropriate fat; then isolating the fat coated microspheres using an appropriate technique.

Processes for coating the core material with the solid fat composition also form a part of the present invention. The core material may be coated with the solid fat composition by means of pan coating, spin disc coating, gas suspension coating, centrifugal coextrusion, rotational suspension, coacervation, inclusion complexation, spray coating, and spray drying. All these coating techniques are well known in the art to which this invention applies and modifications of these techniques to coat various core materials can be easily determined by a person of ordinary skill in the art.

Having described the invention in general terms, reference is now made to specific examples. It is to be understood that these examples are not meant to limit the invention, the scope of which is determined by the appended claims.

EXAMPLE 1

Fat on Hammer-milled Polydextrose.

A slurry of 120 grams of polydextrose powder (hammer-milled to a mean particle size of 20–30 microns) and 30 grams of fat in 350 grams of absolute ethanol was heated to reflux (78° C.), then allowed to cool to about 25° C. during a period of about 4 hours. Twenty-five grams of deionized water was then added slowly. The slurry was cooled to 0°–5° C. and held at this temperature for 30 minutes.

The fat coated polydextrose was recovered from the ethanol slurry by vacuum filtration and dried for 24 hours in a vacuum oven at a temperature of about 30° C. and a pressure of about 50 torr. After drying, the particles were disaggregated by passing through a 200-mesh (75 micron) sieve.

The coated particles were determined by a chloroform extraction assay to contain 19.5% fat by weight. Mean particle diameter was 22 microns before coating, 28 microns after coating. Calculated caloric value was 2.6 calories per gram.

EXAMPLE 2

Fat on Spray-dried Polydextrose.

A slurry of 600 grams of spray-dried polydextrose powder with a mean particle diameter of 4 microns and 150 grams of fat in 1750 grams of absolute ethanol slurry was heated to about 55° C., then cooled to 0°–5° C. during a period of about 2 hours and held at this temperature for an additional 2 hours.

The fat coated polydextrose was recovered from the ethanol slurry by vacuum filtration and dried for 24 hours in a vacuum oven at a temperature of about 30° C. and a pressure of about 50 torr. After drying, the particles were disaggregated by passing through a 200-mesh (75 micron) sieve. The coated particles were determined by a chloroform extraction assay to contain 19.5% fat by weight. Mean particle diameter was 4 microns before coating, and did not increase significantly (within the accuracy of the measurement) after coating. Calculated caloric value was 2.6 calories per gram.

EXAMPLE 3

Fat on Wet-milled Polydextrose.

A slurry of about 200 grams of polydextrose in about 800 grams of ethanol (from wet-milling in an attritor to a mean particle diameter of 12 microns) was mixed with 20 grams of fat. This slurry was heated to about 55° C. then cooled to 25° C. during a period of 4 hours. Fifty-one grams of deionized water was then added slowly. The slurry was cooled to 0°–5° C. and held at this temperature for about 2 hours.

The fat coated polydextrose was recovered from the ethanol slurry by vacuum filtration and dried for 24 hours in a vacuum oven at a temperature of 30° C. and a pressure of about 50 torr. After drying, the particles were disaggregated by passing through a 200-mesh (75 micron) sieve. The coated particles were determined by a chloroform extraction assay to contain 8.3% fat. Mean particle diameter was 11 microns before coating, 16 microns after coating.

EXAMPLE 4

Fat on soft hydrated polydextrose beads.

A mixture of 700 grams of polydextrose with 300 grams of water was heated to reflux (103°–106° C.) while stirring. Water was stripped from the refluxing polydextrose solution to provide a hot syrup containing about 15% water. This was poured into a cold pan (about 10° C.). The cooled, hardened hydrated polydextrose was milled at low temperature (approximately −50° C.) in a Waring blender with ethanol. The milled polydextrose was filtered from solution and air dried for about 1 hour. A portion of the product (120 grams) was slurried with 30 grams of fat in 350 grams of absolute ethanol. This slurry was heated to about 55° C., allowed to cool to 25° C. during a period of 4 hours, then further cooled to about 5° C. and held at this temperature for 30 minutes.

The fat coated polydextrose was recovered from the ethanol slurry by vacuum filtration and dried for 24 hours in a vacuum oven at a temperature of about 30° C. and a pressure of abut 50 torr. After drying, the particles were disaggregated by passing through a 200-mesh (75 micron) sieve. The coated particles were determined by a chloroform extraction assay to contain 23.4% fat. Mean particle diameter was 25 microns before coating, 34 microns after coating. Calculated caloric value was 2.8 calories per gram.

In each of Examples 1–4, certain variables can be chosen to provide the desired performance in targeted food applications. TABLE 1 lists the fats used to provide the range of melting points used in food applications:

TABLE 1

| Trade Name[1] | Description | Melting Point |
|---|---|---|
| Durkee KLX | Partially Hydrogenated Vegetable Oil (Cottonseed, Soybean) | 45° C. |
| Paramount X | Partially Hydrogenated Vegetable Oil (Palm Kernel, Soybean, Cottonseed) | 45° |
| Hydrol 100 | Partially Hydrogenated Coconut Oil | 43° C. |
| Code 321 | Partially Hydrogenated Soybean Oil | 38° C. |
| Satina 44 | Partially Hydrogenated Palm Kernel Oil with Lecithin | 35° C. |
| Centrmelt | Palm Oil with Tocopherol | 29° C. |

[1]all fats supplied by Durkee Industrial Foods Corp., Cleveland OH.

In addition to fat melting point, the ratio of polydextrose substrate to fat coating provides the desired degree of caloric reduction for targeted food applications. TABLE 2 lists the design ratio of polydextrose to fat and resulting caloric values:

TABLE 2

| Ratio of polydextrose to fat | Calculated caloric value |
|---|---|
| 1:1 | 5.0 cal/gm |
| 2:1 | 3.6 cal/gm |
| 3:1 | 3.0 cal/gm |
| 4:1 | 2.6 cal/gm |
| 5:1 | 2.3 cal/gm |
| 10:1 | 1.7 cal/gm |

EXAMPLE 5

Gelled Agar Core.

A mixture of 5 grams of Durkee KLX fat, 5 grams of Atmos 150 emulsifier and 100 grams of hexane emulsifier was charged into a water-jacketed Waring blender and stirred slowly at about 55° C. until a homogeneous solution was obtained. The rate of stirring was then increased, and 50 grams of a 2% aqueous agar (Graceleria) solution was added to form an emulsion. After 5 minutes of blending, the emulsion was cooled to about 10° C. by circulating ice water through the blender jacket. The fat coated gel product was recovered as free-flowing particles (27.6 g) by spray drying the emulsion. Characteristics of product: fat content 16.6%, caloric value 1.56 calories per gram.

EXAMPLE 6

Other fat-coated gels were prepared by the method of Example 5 except that different edible fats and emulsifiers were used, as summarized in Table 3.

TABLE 3

Fat Coated Agar Gels

| Ratio of 2% agar gel to fat to emulsifier | Fat (type) | Emulsifier (type) | Caloric Value (cal/gram) |
|---|---|---|---|
| 1:1:0.05 | KLX | Lecithin | 4.54 |
| 4:1:1 | KLX | Atmos 150 | 3.06 |
| 4:1:0.5 | Durkee 17 | Dur-Em 114 | 2.52 |

TABLE 3-continued

Fat Coated Agar Gels

| Ratio of 2% agar gel to fat to emulsifier | Fat (type) | Emulsifier (type) | Caloric Value (cal/gram) |
| --- | --- | --- | --- |
| 4:1:0.1 | KLX | Atmos 150 | 2.01 |
| 8:1:1 | Satina 44 | Atmos 150 | 1.87 |

EXAMPLE 7

Polydextrose/Pectin Core.

To a Hobart mixer was added, in the order given: 50 grams of polydextrose, 20 grams of citrus pectin, and 300 grams of water. This mixture was blended at the high speed setting for 5 minutes, then allowed to harden for approximately five minutes. The material was washed with ethanol, dried under moderate vacuum for 48 hours at about 35° C., and ground into a fine powder. A portion of this material was then coated with fat as follows: 5.62 grams of polydextrose/pectin was slurried with 2.8 grams of fat in 60 grams of absolute ethanol. The slurry was heated to reflux (78° C.), then cooled to room temperature during a period of about 3 hours. The resulting fat coated material was recovered by vacuum filtration and dried. Microscopic examination (dark field) revealed that the substrate had been successfully coated with fat.

EXAMPLE 8

Agar gel core; n-propanol fat solvent

A 2% agar gel (70 grams) was milled in 100 ml of n-propanol for three minutes at high speed in a Waring blender. The resulting slurry was transferred into a 500 ml round-bottom flask along with 49 grams of fat (mixture of 35 grams of Durkee KLX and 14 grams of Gelucire 70/02) and 100 grams of additional n-propanol. This mixture was heated to about 70° C., then rapidly cooled in an ice bath. The resulting fat coated gel was recovered by vacuum filtration and washed with ethanol followed by distilled water. The particles were dried in a low vacuum oven for 48 hours at about 35° C. Microscopic examination (dark field) revealed that the gel particles had been successfully coated with fat.

EXAMPLE 9

Agar gel core; n-butanol fat solvent

A 20% agar gel (70 grams) was milled in 100 ml n-butanol for three minutes at high speed in a Waring blender. The resulting slurry was transferred into a 500 ml round-bottom flask along with 49 grams of fat (mixture of 35 grams of Durkee KLX and 14 grams of Gelucire 70/02) and 100 grams of additional n-butanol. This slurry was heated to about 70° C., then rapidly cooled in an ice bath. The resulting fat coated gel was recovered by vacuum filtration and exhaustively washed with ethanol, followed by distilled water. The particles were dried in a vacuum oven for 48 hours at 35° C. Microscopic examination (dark field) revealed that the gel particles had been successfully coated with fat.

EXAMPLE 10

Fat-impregnated agar gel core; n-propanol fat solvent

A mixture of 2 grams of agar, 2 grams of Durkee KLX fat and 96 grams of distilled water was heated to boiling, then allowed to cool to room temperature while being vigorously stirred. The resulting agar gel contained 2% fat.

The fat-impregnated agar gel (70 grams) was then milled in 100 ml of n-propanol for five minutes at high speed in a Waring blender. The resulting slurry was transferred into a 600 ml round-bottom flask along with 49 grams of fat (mixture of 35 grams of Durkee KLX and 14 grams of Gelucire 70/02) and 100 grams of additional n-propanol. This slurry was heated to about 70° C., then rapidly cooled in an ice bath. The resulting fat coated gel was recovered by vacuum filtration and washed with ethanol followed by distilled water. The particles were dried in a vacuum oven for 48 hours at about 35° C. Microscopic examination (dark field) revealed that the gel particles had been successfully coated with fat.

EXAMPLE 11

Creation of hollow fat spheres using blowing agents.

In this technique, an oil-in-water emulsion is made using water, a volatile organic material (blowing agent) and an emulsifier. The emulsified droplets of volatile material are then fat coated by coacervation. After isolation, the fat-coated material is vacuum dried to remove the blowing agent, leaving behind hollow fat spheres.

To a 3-neck round-bottom flask was added in the order given: 200 grams of water, 168.4 grams of ethyl acetate, 17.1 grams of fat (Durkee KLX) and 10 drops of Triton X100. With rapid stirring the mixture was heated to reflux (75° C.), then allowed to cool to room temperature. The material was recovered by vacuum filtration, then washed with ethanol followed by distilled water. The particles were dried in a vacuum oven for 14 days at about 35° C. Microscopic examination revealed full and partial fat spheres.

EXAMPLE 12

Coated rigid foam.

Agar gel (2%, 100 grams) was freeze dried to a solid foam material. This was frozen in liquid nitrogen and ground to a powder with a mortar and pestle. The powdered material (9.34 grams) was transferred into a 500 ml round-bottom flask with 150 ml of n-propanol and 2.8 grams of Durkee KLX fat. With rapid stirring, the slurry was heated to about 70° C. then cooled rapidly by immersion of the flask in a dry ice-acetone bath. The material was recovered by vacuum filtration and washed with ethanol followed by distilled water. The particles were dried under vacuum for 36 hours at about 35° C. Microscopic examination (dark field) revealed that the foam particles had been successfully coated with fat.

EXAMPLE 13

Coated micelles.

Into a 1000 ml, 4-neck round-bottom flask was added in the order given: 413.5 grams of distilled water, 24 grams of Durkee KLX fat, and 8 grams of Triton X100 emulsifier. With vigorous stirring, the mixture was heated to reflux, then rapidly cooled using an ice bath. The material was recovered by vacuum filtration and dried under vacuum. Microscopic examination of the material (SEM) showed fat coated spheres with a mean diameter of about 100 microns.

EXAMPLE 14

CORN CHIPS

| Ingredients | Weight percent |
| --- | --- |
| Baked corn chips | 75 |
| Fat-coated polydextrose (FC-PDX) comprised of 10:1 polydextrose:fat (fat m.p. 97° F.) | 15 |
| Seasonings | 10 |
|  | 100 |

The cold chips were dusted with FC-PDX, followed by sieving of the excess FC-PDX. The coated chips were then heated at 140° C. for 3 minutes, followed by a recoating and reheating at 140° C. for 3 minutes and then another recoating and reheating at 140° C. The coated chips were coated with seasonings, excess seasoning was sieved off, and the coated chips were heated at 140° C. for three minutes followed by recoating with additional seasonings and removal of the excess seasoning by sieving. The chips were held in an atmosphere of steam for 1-2 minutes, then heated at 140° C. for 2 minutes.

EXAMPLE 15

CREAMY FRENCH DRESSING

| Ingredients | Weight percent |
| --- | --- |
| Fat-coated agar gel comprised of 4:1.85 gel:fat | 46.48 |
| Distilled Water | 37.55 |
| Vinegar | 9.47 |
| Sugar | 2.00 |
| Maltodextrin | 1.70 |
| Salt | 1.00 |
| Xanthan Gum | 0.35 |
| Propylene glycol alginate | 0.16 |
| Polysorbate 60 | 0.10 |
| Lemon Juice | 0.10 |
| Sodium Benzoate | 0.10 |
| Potassium Sorbate | 0.10 |
| Spices | 0.77 |
| Flavors | 0.12 |
| Total | 100.00 |

Water, vinegar, sugar, maltodextrin, salt, polysorbate 60, lemon juice, sodium benzoate and potassium sorbate were blended and while mixing, xanthan gum and propylene glycol alginate were slowly added. The mixture was blended for 5 minutes. After blending, spices and flavors were added and the mixture was stirred for 5 minutes. The fat substitute was slowly added while mixing followed by an additional 2 minutes of mixing and homogenization at 500–1,000 psi.

EXAMPLE 16

CREAMY ITALIAN DRESSING

| Ingredients | Weight percent |
| --- | --- |
| Distilled Water | 47.87 |
| Fat-coated polydextrose comprised 4:1 polydextrose:fat | 35.00 |
| Vinegar | 8.37 |
| High Fructose corn syrup #42 | 2.67 |

CREAMY ITALIAN DRESSING -continued

| Ingredients | Weight percent |
| --- | --- |
| Lemon Juice | 2.60 |
| Salt | 1.63 |
| Avicel PH 105 | 1.10 |
| Dried Cream extract | 0.65 |
| Avicel RC 581 | 0.62 |
| Xanthan gum | 0.37 |
| Polysorbate 60 | 0.26 |
| Gum tragacanth | 0.20 |
| Sodium benzoate | 0.07 |
| Spice | 0.59 |
| Total | 100.00 |

Water, Polysorbate 60, Avicel RC 581, Avicel PH 105, high fructose corn syrup and salt were blended and while being mixed, gums were added and the mixture was stirred for 5 minutes. After stirring, sodium benzoate, vinegar and remaining ingredients (spices, lemon Juice and dried cream extract) were added and mixed for 2 minutes. The fat substitute was added slowly while mixing followed by an additional 2 minutes of mixing and homogenization at 500–1,000 psi.

EXAMPLE 17

SANDWICH COOKIE FILLING

| Ingredient | Weight percent |
| --- | --- |
| Shortening - Crisco | 15.96 |
| Vanilla flavor | 0.05 |
| NaCl | 0.10 |
| Alitame 10% triturate in mannitol | 0.11 |
| Confectionary sugar 10X | 25.93 |
| Polydextrose Type N Powder | 42.89 |
| Fat-Coated polydextrose comprised of 4:1 neutralized polydextrose containing 15% water:fat (fat m.p. 97° F.) | 14.96 |
| Total | 100.00 |

The shortening was heated to about 45° C., the vanilla flavor, salt, alitame triturate, sugar and polydextrose powder were added slowly one at a time while mixing manually, and the mixture was allowed to cool to room temperature. The fat-coated polydextrose was added with manual mixing, then the mixture was blended for 3–4 minutes with a Sunbeam Mix Master® at speed setting 4.

We claim:

1. An edible composition of matter consisting essentially of an inner core of polydextrose substantially coated with a digestible solid fat or a digestive semi-solid fat, wherein said composition is in the form of free flowing material consisting of solid particles of a size of less than 250 microns.

2. A composition according to claim 1 wherein said polydextrose is hammer-milled polydextrose.

3. A composition according to claim 1 wherein said polydextrose is spray-dried polydextrose.

4. A composition according to claim 1 wherein said polydextrose is wet-milled polydextrose.

5. A composition according to claim 1 wherein said polydextrose is in the form of soft hydrated polydextrose beads.

6. A method of reducing the fat content of a food containing triglycerides comprising replacing at least a portion of the normally present triglyceride with the composition of claim 1.

7. A foodstuff having at least a portion of the normally present triglyceride replaced by the composition of claim 1.

8. A composition according to claim 1, wherein the fat has a melting point of about 20° C. to about 45° C.

9. An edible fat substitute composition comprising an inner core of a material selected from the group consisting of ultrafine microcrystalline cellulose, polydextrose, erythritol, non-fibrous cellulose derivatives, micronized bran and waxes, and mixtures thereof, coated with a fat having a melting point of about 20° C. to 45° C., wherein said composition is a free-flowing material of solid particles having a size of 250 microns or less.

10. A composition according to claim 9 wherein the inner core is polydextrose.

11. A composition according to claim 10 having a particle size of about 4 to about 28 microns.

12. A composition according to claim 11 wherein the ratio of polydextrose to fat ranges from 1:1 to 10:1.

13. A composition according to claim 10 which delivers about 1.7 to about 5 calories per gram.

14. A composition according to claim 10 wherein the coating fat has a melting point of about 29° C. to about 45° C.

15. A method of reducing the fat content of a food product containing triglycerides comprising at least a portion of the triglycerides with the composition of claim 10.

16. A fat-containing food product having at least a portion of the fat replaced by the composition of claim 10.

17. A method of reducing the fat content of a food product containing triglycerides comprising at least a portion of the triglycerides with the composition of claim 9.

18. A fat-containing food product having at least a portion of the fat replaced by the composition of claim 9.

* * * * *